June 28, 1938.  H. B. VOLLRATH  2,122,187
CHEMICAL APPARATUS
Filed June 3, 1936  2 Sheets-Sheet 2

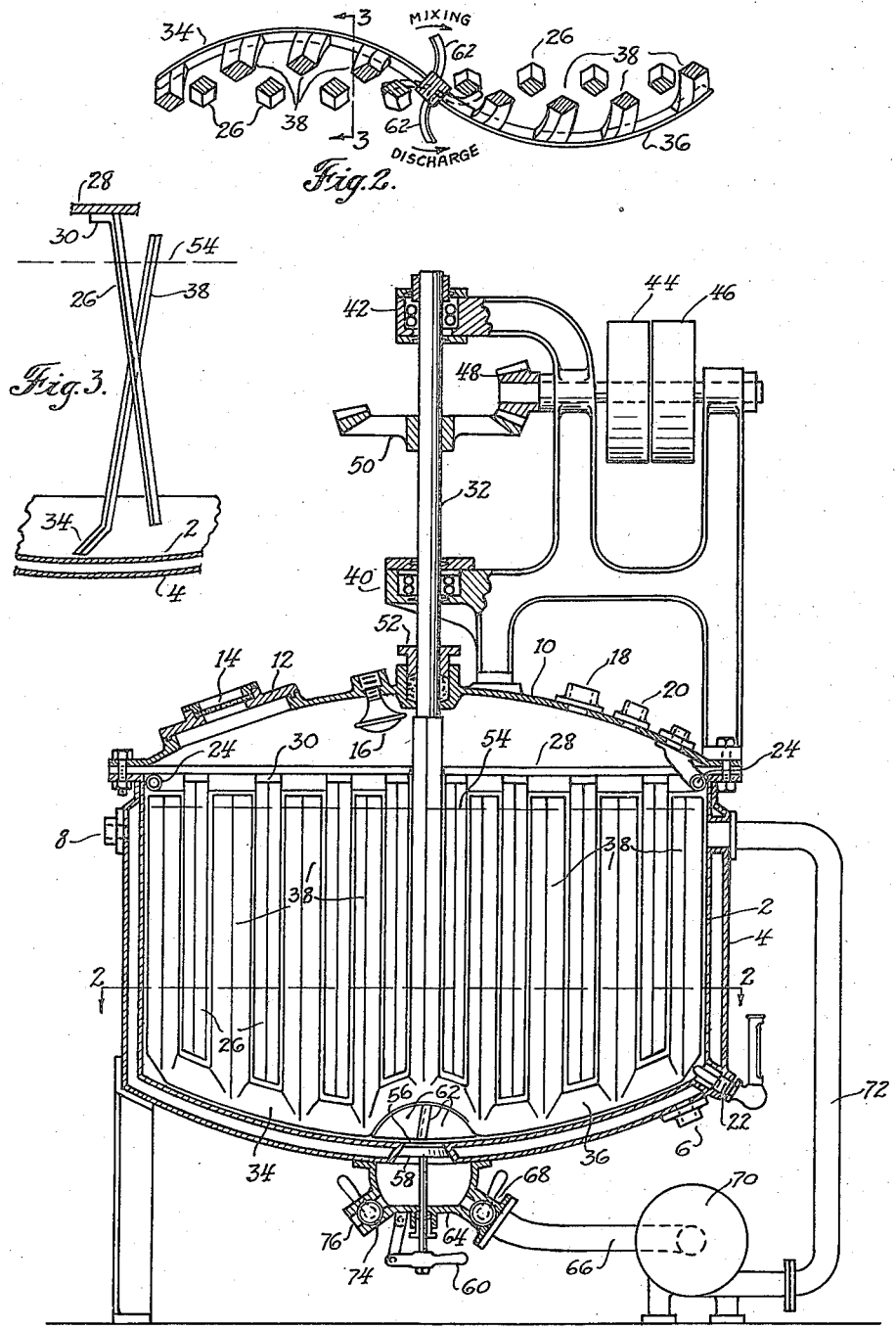

INVENTOR
HAROLD B. VOLLRATH.
BY Albert Sperry
ATTORNEY

Patented June 28, 1938

2,122,187

UNITED STATES PATENT OFFICE 2,122,187

CHEMICAL APPARATUS

Harold B. Vollrath, Bronxville, N. Y.

Application June 3, 1936, Serial No. 83,201

6 Claims. (Cl. 259—107)

My invention relates to apparatus for use in carrying out chemical reactions and while particularly adapted for use in effecting the xanthation of alkali cellulose and the solution thereof in alkali for producing viscose, the apparatus may be used for other purposes and in carrying out other operations.

Viscose has generally been manufactured heretofore by either of two processes. In one process alkali cellulose is tumbled within a hexagonal or cylindrical rotating drum, or churn, to which carbon bisulfide is admitted for converting the alkali cellulose to cellulose xanthate. The xanthate is then transferred to a mixer or dissolver wherein it is stirred or mixed with a solution of caustic alkali to dissolve or disperse the xanthate and produce viscose. Apparatus of this type is unsatisfactory, because, in discharging the churn after xanthating the alkali cellulose, carbon bisulfide vapor escapes into the room where the operation is carried out, endangering the health of the operators and presenting a serious fire and explosion hazard due to the very explosive nature of the carbon bisulfide vapor. As much as possible of the excess $CS_2$ remaining unabsorbed is evacuated from the churn before opening the discharge door, but still some vapor always remains to escape into the room. Moreover, the absence of agitating mechanism in the xanthating churn and the dependence on mere tumbling of the alkali cellulose to get it all exposed to the $CS_2$ do not result in the quickest and best possible reaction between these two products.

In accordance with the other accepted process for producing viscose, the alkali cellulose is charged into a mixing chamber in which it is kneaded during treatment thereof with carbon bisulfide, producing cellulose xanthate in the form of a tough, rubbery dough. Alkali is then added very slowly while kneading the mass to convert the xanthate to a paste and finally this paste is diluted with water to dissolve it to produce viscose. However, the xanthate dough is so stiff and tough that powerful driving means are required (generally 25 to 30 horse power) and very great strains are applied to the apparatus. Moreover, the packing glands about the four axles of the two kneading arms are submerged and therefore subjected to the corrosive and dissolving action of the carbon bisulphide and alkali used. This fact, together with the strain imposed on the glands, renders it neccessary to replace the packing and repair the gland very frequently. The cost of carrying out the operation is therefore high and the apparatus requires constant attention. Furthermore, if the addition of alkali or water is not carefully controlled, the dough breaks up into lumps or "flounders" which cannot be further disintegrated by the kneading mechanism except at great cost of time and effort and the whole batch of material must be discarded.

In accordance with my invention difficulties presented by the apparatus used heretofore in the manufacture of viscose are avoided and apparatus is provided which is comparatively inexpensive to produce and to operate and which avoids both the danger of fire and explosion of the apparatus employed in the process first described and the strain and power consumption as well as the necessity for great care in operation and maintenance of the apparatus used in the second of the processes described.

A preferred form of apparatus embodying my invention comprises a single chamber or converter in which both the xanthating and dissolving operations may be carried out successively, without opening the machine, and a novel type of mixing or agitating means is provided which avoids the formation of a heavy dough and insures rapid and effective solution or dispersion of the xanthate in the alkali to produce viscose. The agitating or stirring means is capable of imparting a gentle mixing tumbling, and lifting movement to the alkali cellulose for displacing it both horizontally and vertically during the xanthating operation and of imparting a vigorous churning and comminuting or shearing action to the mixture of xanthate and alkali solution during the dissolving operation. The mechanism may also include means for successively churning and comminuting relatively small portions of the material at high speed while the main body of material is undergoing agitation at a somewhat lower speed. Moreover, the parts may be arranged so that the load upon the machine is distributed more nearly evenly throughout the rotation of the parts than in constructions heretofore used.

Therefore, one of the objects of my invention is to provide a novel type of mechanism for use in carrying out chemical reactions such as the xanthation and dissolving steps in viscose manufacture.

Other objects of my invention are to reduce the power consumption and necessity for cautious manual control of the operations heretofore required in viscose manufacture and to eliminate the fire and explosion hazards and the danger to health involved in the use of two separate apparatus elements for carrying out xanthating and dissolving operations, to effect rapid solution or dispersion of cellulose xanthate in alkali solution to produce viscose and to improve the resulting product.

These and other objects and features of my invention will appear from the following description thereof, in which reference is made to the accompanying figures of the drawings wherein:

Fig. 1 is a vertical sectional view of a typical form of apparatus embodying my invention, Fig. 2 is a horizontal sectional view of the stirring and shearing members of the construction of Fig. 1 taken on the line 2—2, Fig. 3 is a vertical sectional view of the stirring members of Fig. 2 taken on the line 3—3 thereof.

Figures 4, 5:
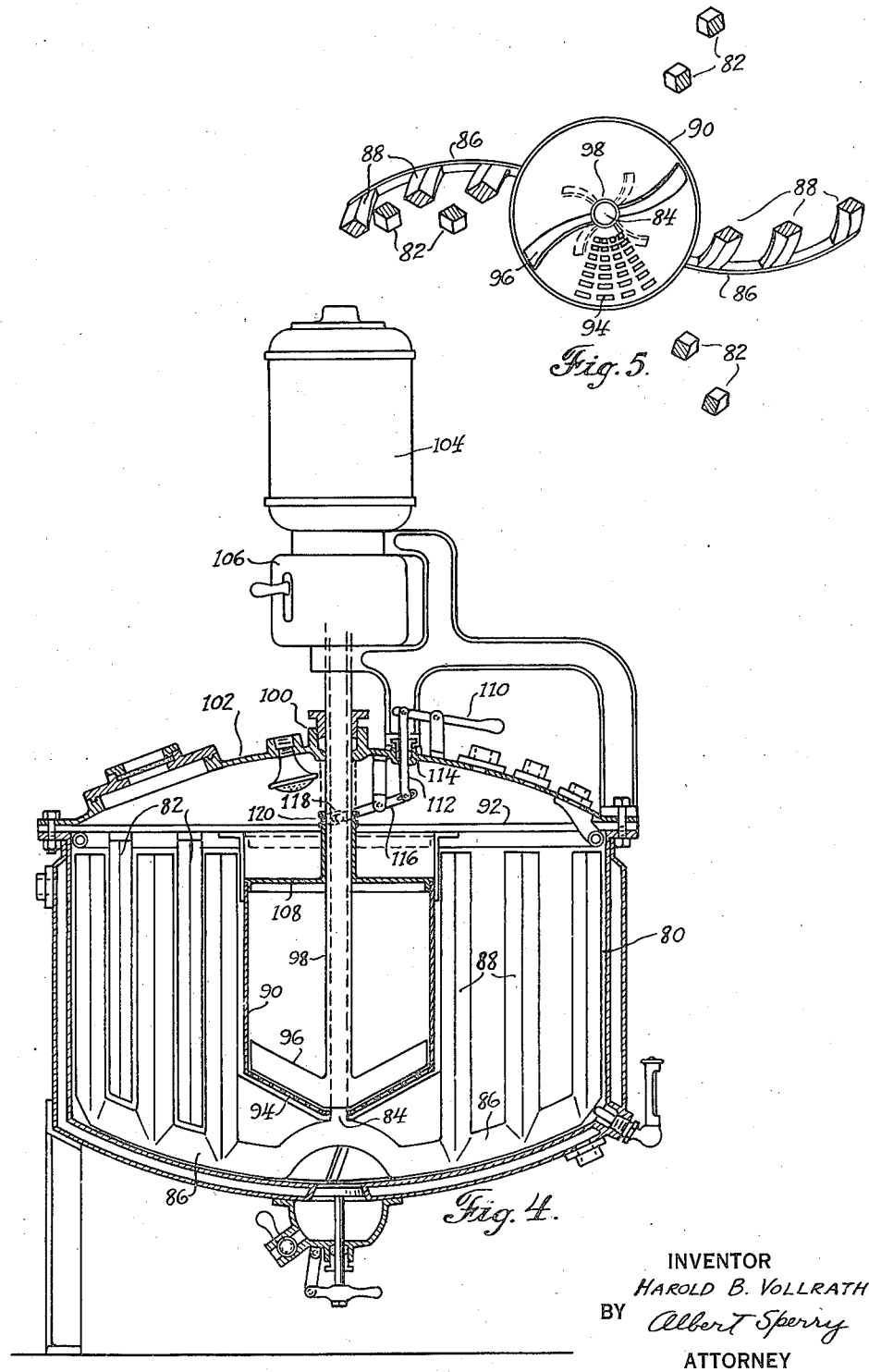
Fig. 4 is a vertical sectional view of an alternative construction embodying my invention.
Fig. 5 is a horizontal sectional view of the construction of Fig. 4 taken on the line 5—5 thereof.

That form of my invention chosen for purposes of illustration in Fig. 1 is shown in the drawings as comprising a chamber 2 which may be formed of sheet metal or other suitable material and preferably is considerably wider than it is deep so that a large area of material is continuously exposed to carbon bisulfide vapors in the xanthating operation. A water jacket 4 surrounds the lower portion of the chamber 2 and extends above the reaction space therein. An inlet 6 and an outlet 8 are provided for the circulation of water or a cooling medium about the chamber to cool the reaction mass, although when used for carrying out other processes, steam or hot water may be circulated through the jacket to maintain the desired reaction temperatures.

The chamber 2 is provided with a cover 10 having a charging opening provided with a closure 12. A sight glass 14 for observing operations in the chamber is also provided and as shown, may be carried by the closure 12 or in any suitable location. Several spray nozzles 16 are provided for the introduction and perfect distribution of carbon bisulfide over the surface of the alkali cellulose and suitable connections 18 and 20 are provided respectively for the introduction of the alkali solution used for dissolving the xanthate produced, and for drawing vacuum or admitting compressed air to aid in discharging the chamber. A thermometer well 22 may also be provided in the side of the tank and other suitable connections may be made for introducing reagents and carrying out and controlling reactions taking place within the chamber. A circular perforated wash water supply pipe 24 extends about the walls of the chamber and is connected through the cover 12 so that water may be introduced for cleaning the chamber after completion of one operation and prior to charging the chamber for a succeeding operation.

Within the chamber 2 are located, stationary fingers 26 secured to a support 28 by flanges 30, or formed integrally therewith so as to be held in fixed position. These fingers extend downwardly into the chamber and may be suitably spaced and arranged as desired. As shown in Fig. 3, the stationary fingers 26 may also be inclined or shaped to aid in the stirring or mixing operations although part or all of the fingers may be positioned vertically if preferred.

A stirring shaft 32, the lower portion of which may be square in cross section, extends downwardly into the chamber 2 below the support 28 to a point adjacent the bottom of the chamber and oppositely extending arms 34 and 36 are secured thereto, or formed integrally therewith. The arms 34 and 36 preferably are curved in opposite directions as shown in Fig. 2 and are inclined with respect to the bottom of the chamber as shown in Fig. 3. Upwardly extending fingers 38 spaced to pass between the stationary fingers 26 are secured to the arms and may also be inclined as shown in Figs. 2 and 3 so that they extend rearwardly of the convex face of the arms 34 and 36. Rotation of the shaft 32 and arms 34 and 36 in the direction of the arrows of Figs. 2 and 3, therefore, stirs the material in both horizontal and vertical planes, not only mixing it but lifting the material, and as it is stripped from the rotating fingers 38 by the stationary fingers 28, the material is allowed to fall back into the mass so that it is thoroughly exposed to the action of carbon bisulfide vapors permeating the chamber. Any tendency for the material to lump or form large masses is thereby overcome, and a certain amount of shearing action between the stationary and movable fingers may be obtained as they rotate, thus further reducing or overcoming any tendency of the material to form lumps.

Upon reversal of the direction of rotation during the dissolving operation and after the addition of the alkali solution, the curved arms 34 and 36 gather in the material toward the center of the chamber and the inclined fingers force it downwardly, shearing the material by the scissors-like action of the relatively inclined stationary and movable fingers as it is forced between the same. The xanthate is thereby disintegrated and comminuted as it is churned in the alkali solution. The square lower portion of the shaft 32 also cooperates with the stationary fingers adjacent thereto to further shear and churn the material.

The curved form of the arms 34 and 36 and the inclined arrangement of the fingers 26 and 38 also serve to reduce the shock and strain upon the apparatus as the arms rotate, since the moving fingers 38 are not parallel to or adjacent the stationary fingers 26 throughout their length at any time. Moreover, the movable fingers pass successively between the stationary fingers, thereby avoiding the sudden load and shock that would be applied to the apparatus if all of the moving fingers were to pass between the stationary fingers simultaneously. Alternative arrangements of the stationary fingers 26 may of course be used to increase the distribution of the strain still further or for other purposes and therefore various forms and arrangements of the arms and fingers may be used to adapt the construction to any particular operation to be carried out in the apparatus.

The shaft 32 by which the rotatable arms 34 and 36 and fingers 38 are carried, is supported in bearings 40 and 42 and is driven by suitable drive means such as the pulleys 44 and 46 and bevel gears 48 and 50. The pulley 44 serves to drive the shaft and arms slowly in the direction of the arrows of Figs. 2 and 3 during the xanthating treatment, whereas the pulley 46 serves to drive the shaft and arms in the opposite direction at relatively high speed during the dissolving operation, suitable clutch mechanism (not shown) being used to change the direction and speed of drive of the shaft.

A feature of importance in the present construction resides in the provision of a single packing gland 52 in the cover through which a round portion of the shaft 32 extends. This gland may be of any suitable construction capable of resisting the action of carbon bisulfide vapors, but is located above the liquid level indicated by the line 54 so that it is not directly subjected to the dissolving action of liquid carbon bisulfide nor the corrosive action of the alkali used in dissolving the xanthate, and therefore requires very little attention or repacking.

The chamber 2 may be discharged or material drawn off through an opening 56 in the base of the chamber which is normally closed by a suitable valve such as the inverted poppet valve 58 actuated by a quick opening device such as the handle 60. The shape of the arms 34 and 36 is curved upwardly from the bottom of the chamber adjacent the outlet opening, to permit ready flow of material therethrough, and a member 62 provided with four curved arms is carried by the shaft and positioned over the opening to rotate with the shaft and to push xanthate away from and draw viscose toward the opening to aid in discharge or withdrawal of the contents of the chamber.

In the construction of Fig. 1 the chamber is provided with a small enclosure 64 about the poppet valve 58 with which a relatively large pipe 66 communicates. The pipe 66 is controlled by a valve 68 and serves to conduct the material being treated to a high speed grinding and churning device 70 which serves also to draw off material and after grinding thereof to force the disintegrated and dispersed material through pipe 72 back into the chamber 2 near the liquid level 54.

During the dissolving operation, the device 70 may be actuated after opening the poppet valve 58 and valve 68 so that while continuing the agitating and churning of the mixture of cellulose xanthate and alkali solution within the chamber 2, a relatively small portion thereof may be continuously drawn off and subjected to a high speed grinding and churning treatment and returned to the body of material in the chamber. At the same time, the arms 34 and 36 continue to subject the main body of material to the churning and shearing action of the rotating and stationary fingers 26 and 38 while the member 62 draws any lumps or pieces of material that may be present toward the outlet opening 56, so that they may be treated in the high speed grinder 70. The power required for operating the high speed grinder is relatively small, whereas substantially the whole body of liquid is treated successively thereby as the operation continues.

Upon completion of the dissolving or dispersing operation, the valve 68 may be closed and a valve 74 in a discharge conduit 76 communicating with the enclosure 64 opened to discharge the finished and treated product therefrom.

In producing viscose with the apparatus described, the closure 12 is removed and alkali cellulose preferably in comminuted form such as "crumbs" is charged into the chamber to approximately the level of line 54 of Fig. 1. The closure 12 is replaced and the shaft 32 and arms 34 and 36 are rotated slowly from pulley 44 to lift and stir the material. Carbon bisulfide is then introduced through the nozzles 16 in the required amount for converting the alkali cellulose to cellulose xanthate. The treatment is continued while controlling the temperature of the reaction until substantially complete conversion has taken place. Any excess carbon bisulfide vapors remaining unabsorbed may then be withdrawn from the chamber by applying vacuum thereto through the connection 20 in the cover 10, if desired, or may be left in the chamber to be dissolved in the viscose; and an alkali solution is introduced through the connection 18. The entire amount of alkali to be used may be introduced rapidly, or as desired, until the level of the mixture within the chamber again reaches about the line 54. The direction of rotation of the shaft 32 and arms 34 and 36 is then reversed and the speed of rotation may be increased considerably by driving from the pulley 46. At the same time, or subsequently, the poppet valve 58 is opened and valve 68 and the high speed grinding device 70 are operated to draw off small amounts of the mixture from the lower portion of the chamber, and subject it to vigorous grinding and churning treatment. The treated material is returned to the upper portion of the chamber and a constant flow of material from the chamber to the grinding device and back to the chamber, is established, while continuing agitation of the main body of material without interruption.

Upon complete dispersion of the cellulose xanthate in the alkali solution and the production of a viscose of the desired cellulose and alkali content, the product is discharged from the chamber by opening the valve 74 using air pressure applied through connection 20 to aid in the discharging operation if desired. The viscose drawn off may be filtered and aged or otherwise treated for use in the production of rayon, "Cellophane", caps and bands, sausage casings, or other articles, as desired.

In the construction of Figs. 4 and 5 a chamber or tank 80 similar to that of Fig. 1 is provided with means within the chamber for disintegrating successive portions of the material at high speed while continuing to churn the main body of material to dissolve the xanthate. In the construction shown rigid downwardly extending fingers 82 are arranged as desired three groups of such fingers being shown in Fig. 5, spaced 120 degrees apart. A stirring shaft 84 extends downwardly in the center of the chamber carrying oppositely extending arms 86 with spaced fingers 88 which may be constructed and arranged in any suitable manner such as that shown in Fig. 1 to pass between the stationary fingers 82.

Centrally of the chamber and surrounding shaft 84 is a tubular casing 90 supported from the member 92, by which the stationary fingers are carried, the lower end of the casing 90 being spaced from the bottom of the chamber so that the rotatable arms 86 may rotate freely beneath the same. Within the casing 90 is located a perforated screen or sieve-like conical member 94 surrounding shaft 84. A rotatable cutting and propelling member 96 is positioned above the sieve 94 and secured to a hollow shaft 98 surrounding the stirring shaft 86. The upper end of shaft 98 extends through packing gland 100 in the cover 102 of the chamber and is provided with means for driving the shaft 98 and cutting and propelling member 96 at high speed. A reversible motor 104 serves to drive the stirring shaft 84 in opposite directions and to drive hollow shaft 98 at high speed during the dissolving operation while allowing it to remain idle during the xanthating operation. The gears, clutch, and transmission necessary for providing the desired driving relation between the motor 104 and shafts 84 and 98 are all enclosed within the housing 106 outside of the chamber. Within the chamber and above the upper end of the casing 90, I prefer to use a movable cover 108 slidable vertically on shaft 98 or movable in any other suitable way so that it can be lowered during the xanthating operation to cover the casing 90 and prevent material from passing into the casing but can be raised to permit circulation of the mixture of cellulose xanthate and alkali solution through the casing 90 when the material is to be dissolved. As shown the cover 108 is movable by means of a pivoted operating lever 110 mounted on the cover and having a link 112 extending downward through packing gland 114 to actuate a similar pivoted arm 116 within the chamber one end of which arm is provided with a lifting fork 118 having rollers extending into the annular groove 120 in a collar surrounding shaft 98 by which the cover 108 is carried.

When the free end of operating lever 110 is depressed the link 112 is raised and the cover 108 lowered to close the casing 90 so that material will not enter the casing during the xanthating operation. However, when dissolving the xanthate produced the free end of lever 110 is raised to uncover the top of the casing and permit the circulation of liquid therethrough.

In using the mechanism shown in Figs. 4 and 5 the lever 110 is depressed to close the upper end of casing 90 and the alkali cellulose "crumbs" charged into the chamber through the charging door in the cover and the chamber evacuated while stirring the material. The xanthating operation is carried out as in the construction of Figs. 1, 2, and 3 by the introduction of carbon bisulfide while stirring to produce a comminuted and loose cellulose xanthate. Thereafter, the excess carbon bisulfide vapors are withdrawn from the chamber and the alkali for dissolving the cellulose xanthate is introduced. The cover 108 is then raised by raising the free end of operating lever 110 and the direction of rotation of the stirring arms 86 and fingers 88 is reversed. The shaft 98 is then driven to rotate the cutting and propelling member 96 at high speed to induce rapid circulation of the material through the casing 90 and through the screen or sieve 94. Preferably, the member 96 drives the material downwardly through the casing 90 so that it is circulated upwardly on the outside of the casing and between the spaced lower portions of the stationary and movable fingers as they approach each other in rotation, thereby insuring shearing and comminuting of the material. The material is thus circulated in a horizontal plane by the arms 86 and fingers 88 as it is comminuted and at the same time is circulated in a vertical plane by the member 96 which also comminutes the material. This operation is continued, stirring, comminuting and agitating the material until the xanthate has been dissolved or dispersed within the alkali and a viscose of the desired composition and uniformity substantially free from lumps is produced. The product is then discharged through the outlet 122, using air pressure to discharge the chamber rapidly if desired.

While the construction shown in Figs. 4 and 5 embodies a packing gland 114 about link 112 in addition to that through which the shaft 98 extends, it will be noted that neither the link 112 nor the shaft 98 is moved or rotated during the xanthating operation when the chamber is charged with carbon bisulfide so that leakage of gas from the chamber does not occur. A suitable packing may be provided between the shaft 84 and tubular shaft 98 in the event gas tends to pass between these parts but ordinarily this will not be necessary.

While I have shown and described two preferred forms of apparatus embodying my invention, it will of course be evident that various changes and modifications may be made in the form and arrangement of the elements thereof, particularly when adapting the apparatus for use in other chemical processes and in the manufacture of products other than viscose. It should therefore be understood that the form of my invention herein disclosed is intended to be illustrative of a typical embodiment thereof, and is not intended to limit the scope of the claims.

I claim:

1. Mechanism for mixing and dissolving material comprising a chamber of circular cross section, spaced stationary fingers extending downwardly into said chamber, a shaft extending axially of said chamber having oppositely extending arcuate arms thereon with spaced fingers projecting upwardly therefrom and arranged to pass successively between said stationary fingers upon rotation of said shaft, said fingers cooperating to lift material being treated when said shaft and fingers are rotated in one direction and to shear the material when said shaft and fingers are rotated in the opposite direction and means for reversibly rotating said shaft.

2. Mechanism for mixing and dissolving materials comprising a chamber of circular cross section, spaced stationary members projecting downwardly into said chambers, drive means, spaced rotatable members rotatable by said drive means extending upwardly in said chamber and arranged to pass between said stationary members and inclined with respect thereto to raise material in said chamber upon rotation in one direction and to shear material between said stationary and movable members upon rotation of said movable members in the opposite direction, means for rotating said movable members in opposite directions and circulating and comminuting means operable independently of said movable members and actuated at high speed for grinding and churning material being treated in said chamber including elements for directing floating or suspended material downwardly in said chamber and toward said circulating and comminuting means.

3. Mechanism for mixing and dissolving materials comprising a chamber of circular cross section, spaced stationary members projecting downwardly into said chambers, drive means, spaced rotatable members extending upwardly in said chamber and rotatable by said drive means and arranged to pass between said stationary members, said members inclined with respect to each other to raise material in said chamber upon rotation in one direction and to shear material between said stationary and movable members upon rotation of said movable members in the opposite direction, means for rotating said movable members in opposite directions, means operable independently of said movable members and actuated at high speed for grinding and churning material being treated in said chamber and valve controlled means for conducting material from said chamber to said means for treatment thereby.

4. Mechanism for successively xanthating alkali cellulose and dissolving the resulting cellulose xanthate in alkali solution to form viscose comprising a closed circular chamber provided with a cover having a charging door, therein means for introducing carbon bisulfide and a solution of alkali into said chamber, a packing gland in said cover, a shaft extending through said gland and downwardly into said chamber provided with oppositely disposed arcuate arms having spaced upwardly extending fingers carried thereby and inclined with respect to the axis of rotation of said shaft, spaced cooperating fingers extending downwardly into said chamber and held in fixed position with respect thereto, means for reversibly rotating said shaft to raise material in said chamber upon rotation in one direction during the xanthating operation and to shear and churn the material in said chamber when rotated in the opposite direction during the dissolving operation, means establishing a path for the flow of material from the lower to the upper portion of said chamber and an independently operable high speed grinding and churning device for treating material passing through said means to disperse the same, said device cooperating with said means to draw material floating or suspended in said chamber downwardly through said means to said device to comminute said material before returning it to the upper portion of said chamber.

5. Mechanism for successively xanthating alkali cellulose and dissolving the resulting cellulose xanthate in alkali solution to form viscose comprising a closed circular chamber provided with a cover having a charging door therein, means for introducing carbon bisulfide and a solution of alkali into said chamber, a packing gland in said cover, a shaft extending through said gland and downwardly into said chamber provided with oppositely disposed arcuate arms having spaced upwardly extending fingers carried thereby and inclined with respect to the axis of rotation of said shaft, spaced cooperating fingers extending downwardly into said chamber and held in fixed position with respect thereto, means for reversibly rotating said shaft to raise material in said chamber upon rotation in one direction during the xanthating operation and to shear and churn the material in said chamber when rotated in the opposite direction during the dissolving operation and means located within said chamber and operable to comminute and circulate material therein, including a rotatable element operable independently of said shaft for directing material floating or suspended in said chamber downwardly in the central portion thereof and upwardly adjacent the outer walls thereof.

6. Mechanism for successively xanthating alkali cellulose and dissolving the resulting cellulose xanthate in alkali solution to form viscose comprising a closed circular chamber provided with a cover having a charging door therein, means for introducing carbon bisulfide and a solution of alkali into said chamber, a packing gland in said cover, a shaft extending through said gland and downwardly into said chamber provided with oppositely disposed arcuate arms having spaced upwardly extending fingers carried thereby and inclined with respect to the axis of rotation of said shaft, spaced cooperating fingers extending downwardly into said chamber and held in fixed position with respect thereto, means for reversibly rotating said shaft to raise material in said chamber upon rotation in one direction during the xanthating operation and to shear and churn the material in said chamber when rotated in the opposite direction during the dissolving operation, a tubular casing surrounding said shaft and spaced from the walls of said chamber and propelling and comminuting means within said casing operable at high speed to direct and circulate material downwardly through said casing and upwardly about the same to comminute and disperse the cellulose xanthate in the alkali solution.

HAROLD B. VOLLRATH.